3 Sheets—Sheet 1.

W. J. LANE.
Measuring-Faucet.

No. 203,627. Patented May 14, 1878.

WITNESSES:
Edw Hunt Jr
E A Welsh

INVENTOR:
William J. Lane
by Donnelly & Wilmot
Attys.

W. J. LANE.
Measuring-Faucet.

No. 203,627. Patented May 14, 1878.

WITNESSES:
Edw Hunt Jr
E A Welsh

INVENTOR
William J Lane

3 Sheets—Sheet 3.

W. J. LANE.
Measuring-Faucet.

No. 203,627. Patented May 14, 1878.

WITNESSES:
Edw. Kuh
E. A. Welsh

INVENTOR:
William J. Lane
by Donnelly
Atty

UNITED STATES PATENT OFFICE.

WILLIAM J. LANE, OF MILLBROOK, NEW YORK.

IMPROVEMENT IN MEASURING-FAUCETS.

Specification forming part of Letters Patent No. 203,627, dated May 14, 1878; application filed March 30, 1878.

*To all whom it may concern:*

Be it known that I, WILLIAM J. LANE, of Millbrook, in the county of Dutchess and State of New York, have invented certain new and useful Improvements in Measuring-Faucets; and do hereby declare that the following is a full, clear, and exact description and specification thereof.

The object of my invention is to facilitate the withdrawal of liquids from casks, and to accurately measure the same while being thus withdrawn.

Figure 1:
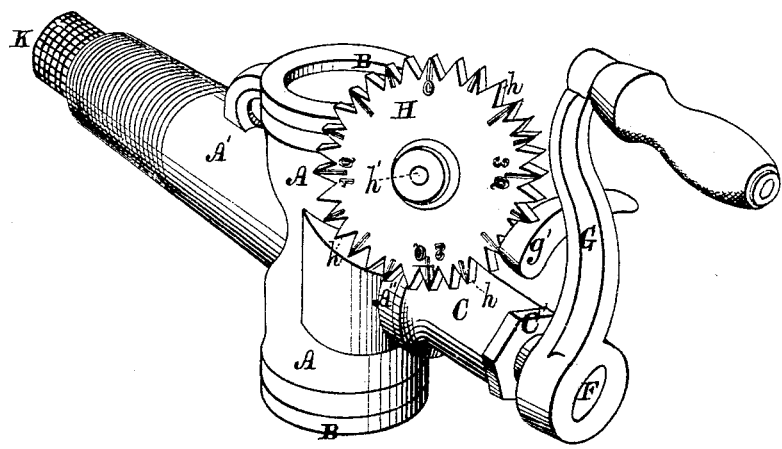
Figure 2:
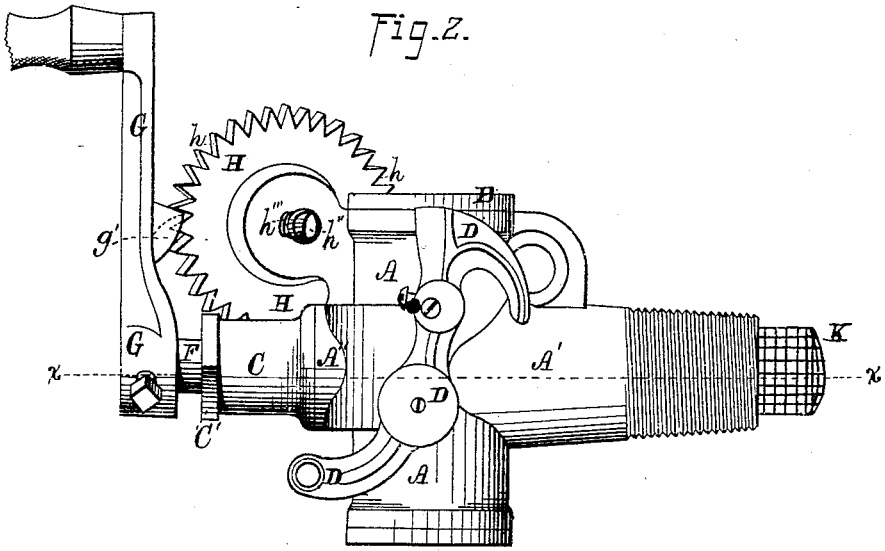
Figure 3:
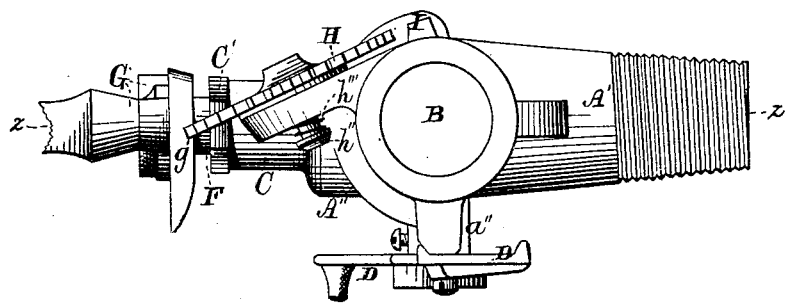
Figure 4:
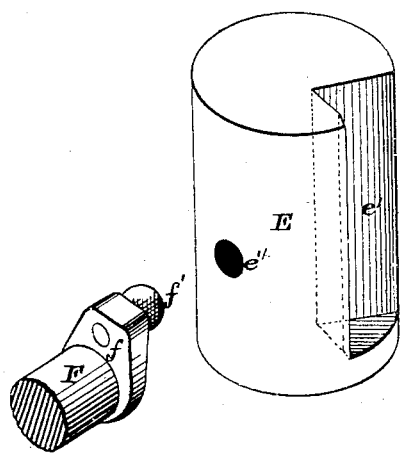
Figure 5:
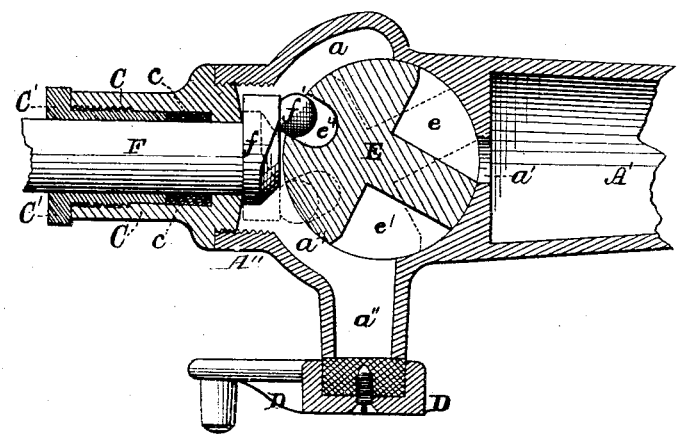
Figure 6:
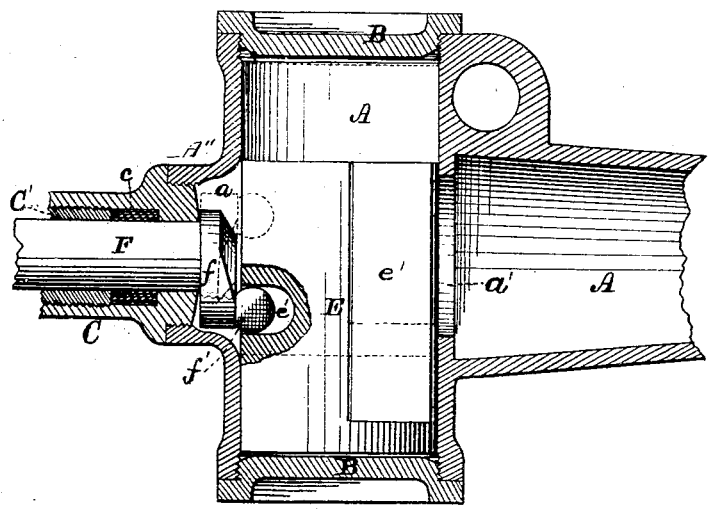

On reference to the accompanying drawings, making a part of this specification, Figure 1 is a perspective view of my improved faucet. Fig. 2 is an elevation of the opposite or under side of the same. Fig. 3 is a side view of the faucet. Fig. 4 is a perspective view of the plunger and its operating-crank separated from each other and from the casing. Fig. 5 is a section upon line $x\ x$ of Fig. 2, and Fig. 6 is a section upon line $z\ z$ of Fig. 3.

Letters of like name and kind refer to like parts in each of the figures.

A represents the casing of my faucet, the otherwise open ends of which are inclosed by means of heads B, that are preferably threaded, and fit into the correspondingly-threaded ends of said cylinder. From the rear side, at the longitudinal center of the casing A, a tapering branch, A', extends horizontally outward, and at its rear end is threaded exteriorly, so as to enable it to be screwed into an opening in a wooden cask, while at a corresponding point at the front side of said casing is a branch, A'', through which access may be had to the interior of the casing. The branch A' communicates with the interior of the casing through an opening, $a'$, which, transversely, is about one-fourth the interior dimensions of said branch, and longitudinally extends nearly to the upper and lower sides of the interior of the same.

The interior of the branch A'', near its outer end, is threaded to receive the threaded end of a sleeve, C, which is provided at its outer end with an ordinary stuffing-box, $c$, and gland C', through which extends a shaft, F.

The casing A, at the center, is enlarged to form inner channels $a\ a^4$ outside of the bore of said casing, which channels, as seen in Fig. 5, extend in each direction circumferentially from the branch A'' one-half the distance from the latter to the branch A'. At one end of the channel $a^4$ is a discharge-nozzle, $a''$, which extends downward, and is closed, when desired, by means of a gate, D, pivoted to or upon the casing A, and capable of being swung over or away from said nozzle.

Within the casing A is placed a plunger, E, which has such diameter as to fit nicely but slide freely therein opposite and across the end of the shaft F, and in length is equal to about two-thirds the length of the interior of said casing. Within the periphery of the plunger E are two cavities or ports, $e\ e^1$, which, in cross-section, have the form and relative arrangement shown in Fig. 5, and each extends from one end of said plunger nearly to the opposite end of the same, their relative arrangement being such as to cause the open ends of said ports to be at opposite ends of said plunger.

The relative peripheral arrangement of the ports $e\ e^1$ is such as to cause one of the same to be in communication with the channel $a$, when the opposite port $e^1$ is caused to coincide with the port $a'$, the object of which will be hereinafter explained.

On the inner end of the shaft F is a disk, $f$, carrying an eccentric-pin, $f'$, which projects forward in a line with said shaft, and has a spherical head. The pin $f'$ fits into a recess, $e^4$, within the periphery of the plunger E at its longitudinal center, and midway, peripherally, between the ports $e\ e^1$, which recess has a sufficient diameter to permit said pin to enter and to move freely therein. If, now, the shaft F is caused to revolve, the crank-pin $f'$ will move the plunger longitudinally, and at the same time partially rotate the same upon its axis, and cause each of the ports $e\ e^1$ to alternately coincide with the port $a'$ and passages $a\ a^4$.

The motion of the plunger E is so timed as to cause the end at which each port $e$ or $e^1$ opens to move away from the head of the casing A when said port is in communication with the induction-port $a'$, by which means a vacuum is created between the end of the plunger and that of the casing, into which liquid flows from said induction-port, while after either port $e$ $e^1$ has been placed in communication with the eduction-port $a''$ the plunger is caused to move in an opposite direction, so as to force the liquid out of the last-named port.

It will thus be seen that a continuous rotation of the shaft F in one direction will cause the plunger E to reciprocate longitudinally within the casing A past the end of the shaft, and produce alternately a vacuum and a pressure within each end of said casing, while, by the semi-rotary motion of the plunger, its ports are caused to coincide alternately with the induction and eduction ports, and it is enabled to perform the additional office of a valve.

By arranging the passage $a$ $a^4$ at the end of the driving-shaft F all liability to the ingress of air around said shaft is avoided, there being at no time a vacuum at such point, while during substantially all of the time when the faucet is being operated there is a pressure at or around said shaft.

The shaft F is operated by means of a crank-handle, G, at its outer end, while, in order that the revolutions of said crank may be recorded, so as to enable the quantity of liquid discharged to be determined, a toothed disk, H, is pivoted upon a suitable support, that is attached to or upon the casing, and one of its teeth, $h$, engages at each revolution of said handle with a scroll-shaped lug, $g'$, attached to or upon the inner face of the handle, the form of said lug being such as to move said tooth forward a distance equal to its width, and leave the next tooth $h$ in position for engagement at the next revolution of said crank.

The quantity of liquid expelled from the faucet at each revolution of the handle G being known, the same is marked upon the face of the disk H at each tooth; or, if desired, the quantity represented by several teeth is marked at regular intervals, and the movement of said disk is indicated by a fixed pointer, I, secured upon the cylinder A in close proximity to the edge of the disk.

When the faucet is to be used, the disk H is turned so as to bring its zero-mark opposite to the pointer I, and the crank G is turned until the rotation of said disk causes the number that indicates the desired quantity to come opposite to said pointer.

In order that the disk H may be prevented from moving too easily, the end of its pivot $h'$ projects through the supporting-lug, and is provided with a head, $h''$, between which and said lug is placed a spiral spring, $h'''$, that constitutes a friction device.

The outer end of the branch A' is protected by means of a strainer, K, which is constructed of or from wire-cloth, and has the form of a short cylinder, with one of its ends left open, said open end being inserted within said pipe, the operation of which strainer is to prevent any solid substance of sufficient size to interfere with the operation of the faucet from entering the same.

The removable ends B B permit access at any time to remove obstructions, while the construction allows the casing to be readily bored out and the nice fitting of the parts.

I claim—

1. The combination, in a measuring-faucet, of a casing having inlet and outlet ports, and containing a plunger, having face ports opening toward opposite ends, and a crank-shaft, whereby the plunger is both reciprocated and turned on its axis to bring each of its ports alternately to coincide with the inlet and outlet ports of the casing, and forcibly remove and expel the liquid, all substantially as set forth.

2. The combination of the reciprocating plunger and the driving-shaft F, connected directly thereto, and imparting both a reciprocating and rotary movement to the plunger, as set forth.

3. The combination, in a measuring-faucet, of the casing, its plunger, and the shaft F, arranged opposite and at right angles to the axis of the plunger, and connected directly thereto by a crank or its equivalent, substantially as set forth.

4. The combination, in a measuring-faucet, of the casing, the driving-shaft F, the plunger reciprocating in the chamber of the casing across the end of the shaft, and operated therefrom, and the ports $a$ $a'$ $a^4$ $a''$ of the casing, and ports $e$ $e^1$ of the plunger, relatively arranged, as set forth.

5. The casing A, having branches A' A'', and with a transverse chamber, closed by detachable heads B B, substantially as set forth.

WILLIAM J. LANE.

Witnesses:
J. FRANK TRIPP,
JOHN R. HORTON.